United States Patent Office 2,748,786
Patented June 5, 1956

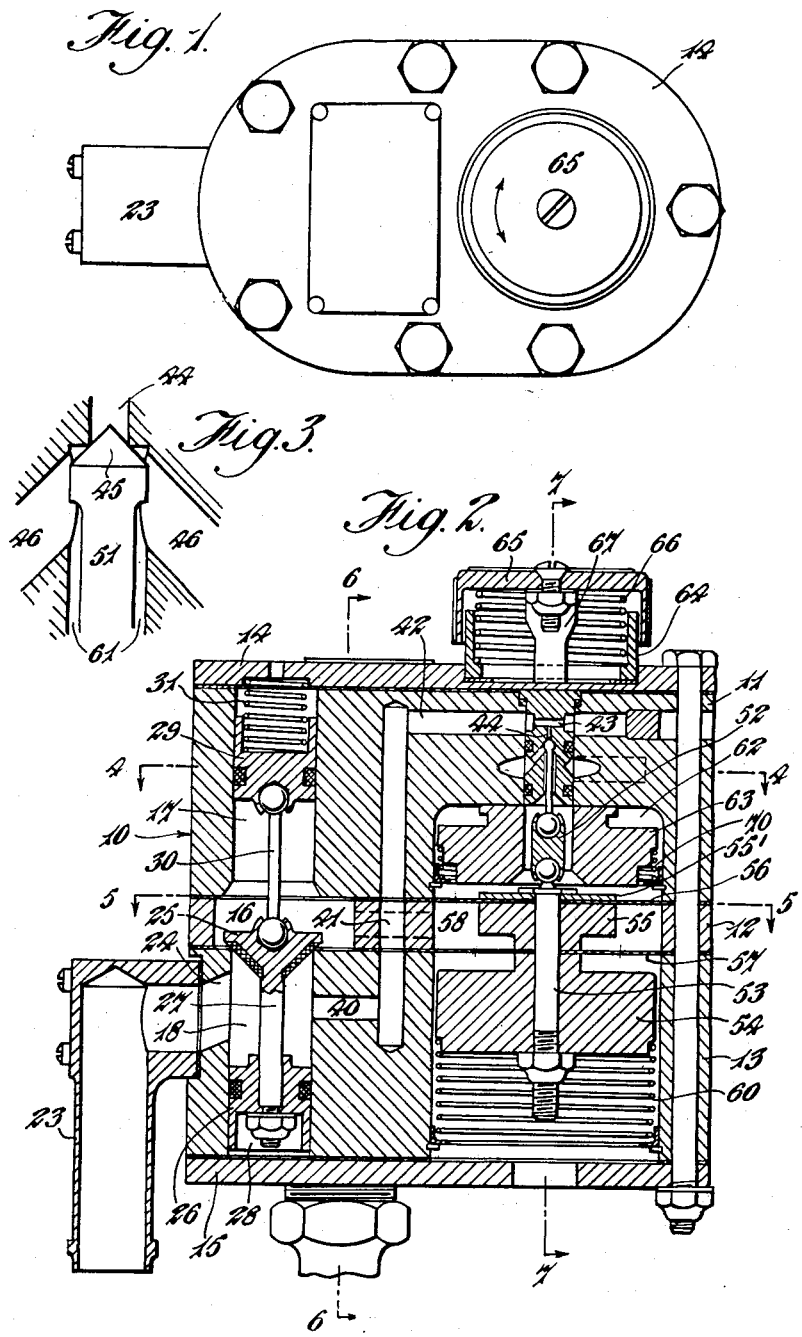

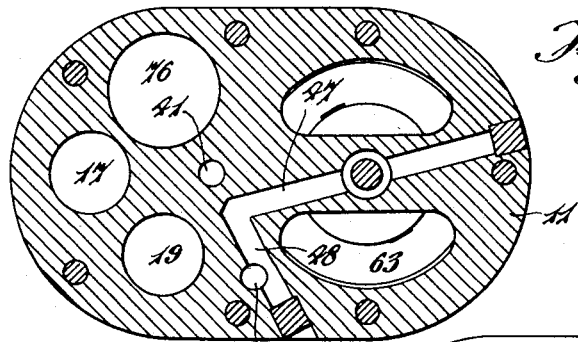
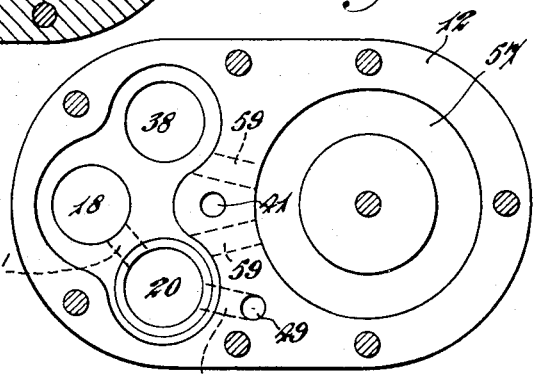
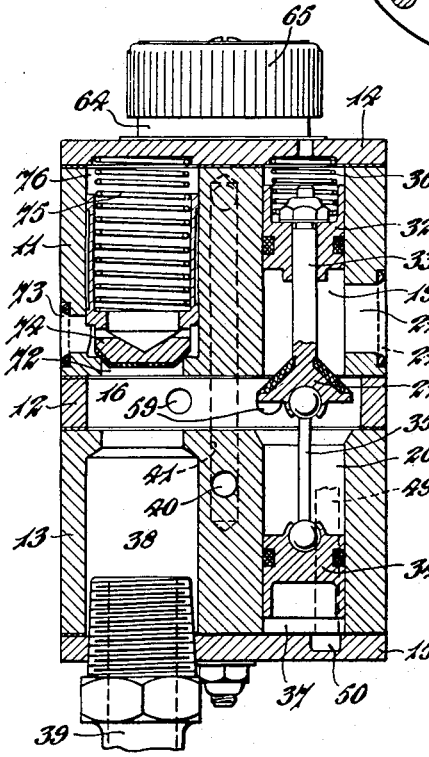
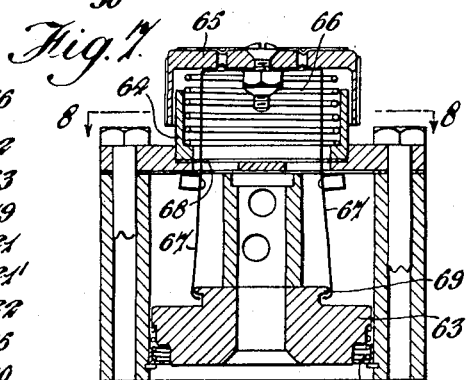
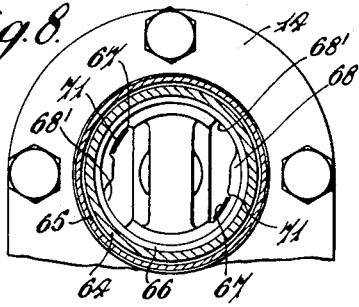

2,748,786

PRESSURE-CONTROL APPARATUS FOR ANTI-G SUITS

Jack Isreeli, New York, N. Y., and George T. Allen, Wolverhampton, England

Application July 14, 1950, Serial No. 173,816

13 Claims. (Cl. 137—38)

This invention relates to pressure-control apparatus for anti-g suits.

For use in aircraft in which personnel are subjected to high values of g, a protective suit has been developed which is known as an anti-g suit. This suit consists essentially of a double-walled bag which is formed of rubber or the like and which surrounds the passenger closely. If air under pressure is introduced into the bag the passenger is subjected to a compressive force which assists him to overcome the ill effects of high g values. The pressure of the suit is required to bear a relationship to the g values so that as the g value increases the suit pressure increases according to a definite law, and pressure-control apparatus is provided so that the pressure of the suit is automatically adjusted as required.

Absence of leakage of pressure air in pressure-control apparatus for anti-g suits is an important factor where aircraft have to fly at high altitudes and must carry their own supply of air, and it is the primary object of the present invention to provide pressure-control apparatus which, whilst accomplishing proper pressure regulation of the suit through a full range of g values, reduces leakage under transient conditions to a low value and which eliminates or substantially eliminates leakage under approximately 1 g conditions.

Further objects of our invention and the advantages flowing therefrom will be apparent from the following description of one form of pressure-control apparatus which is shown in the accompanying drawings, in which Figure 1 is a top plan view of the apparatus;

Figure 2 is a central vertical sectional view;

Figure 3 is a partial sectional view, drawn to an enlarged scale, showing the pilot needle valve of Figure 2;

Figures 4, 5 and 6 are sectional views taken on the correspondingly numbered lines in Figure 2;

Figure 7 is a part sectional view taken on the line 7—7 of Figure 2, and

Figure 8 is a sectional view taken on the line 8—8 of Figure 7.

The anti-g suit pressure-control apparatus shown in the drawings comprises a member responsive to change in velocity along a given axis, a pilot valve actuated by said member responsive to change in velocity, a chamber having an opening for communication with the suit, an outlet opening in said chamber for placing said chamber in communication with the atmosphere, a slave valve controlling said outlet opening, an inlet opening in said chamber for placing it in communication with a source of pressure fluid, a second slave valve controlling said inlet opening, and means under the control of said pilot valve for actuating said first and second slave valves. The apparatus also comprises means controlled by the pressure in said chamber for actuating the pilot valve in opposition to the member responsive to change in velocity.

The valves employed in the apparatus are poppet valves which permit reduction of leakage to a minimum value. The slave valves are pressure balanced under all operating conditions, actuation of the slave valves under the control of the pilot valve being effected by unbalancing the slave valves.

Referring now in greater detail to the drawings the apparatus shown therein comprises a main body portion which is indicated generally by the reference numeral 10 and which comprises three body parts 11, 12, 13 bolted together between upper and lower end plates 14 and 15 respectively. The central body part 12 of the body portion 10 is formed to provide a chamber 16 which communicates with a cylinder 17 in the upper body part 11 and with a cylinder 18 in the lower body part 13, cylinders 17 and 18 being axially aligned. Chamber 16 also communicates with an upper cylinder 19 and a lower cylinder 20 axially aligned with cylinder 19. Cylinder 19 communicates with the atmosphere through passageway 21 having a screen 21' and communication between chamber 16 and cylinder 19 is controlled by poppet valve 22. Cylinder 18 communicates with a connection 23 for a source of pressure air by passageway 24 and communication between cylinder 18 and chamber 16 is controlled by poppet valve 25.

Working in cylinder 18 is a piston 26 which is connected with valve 25 by rod 27 and which provides in the lower part of the cylinder a chamber 28. Working in the upper cylinder 17 is a piston 29 which is connected with valve 25 by a rod 30 by ball and socket joints which allow any misalignment between the piston 29 and the valve assembly to be compensated for. A spring 31 bearing on the upper end of piston 29 urges valve 25 to its closed position.

Working in the upper cylinder 19 is a piston 32 connected with valve 22 by rod 33, and working in the lower cylinder 20 is a piston 34 connected with valve 22 by means of rod 35 by ball and socket joints permitting any misalignment between piston 34 and the valve assembly to be compensated for. A spring 36 bears on the upper end of piston 32 and urges valve 22 to its open position. Piston 34 provides in the lower part of cylinder 20 a chamber 37. Chamber 16 communicates via passageway 38 with an outlet 39 for connection to the anti-g suit.

Cylinder 18 communicates via passageways 40, 41, 42, and 43 with a passageway 44, the opening in the lower end of which is controlled by a pilot valve 45. Passageway 44, when valve 45 is open communicates via passageways 46, 47, 48, 49 and 50 with chamber 37 and also with chamber 28 via passageway 50'.

The stem 51 of pilot valve 45 is connected by means of a ball and socket joint to the upper end of a coupling member 52, to the lower end of which is connected, by means of a further ball and socket joint, a rod 53 on which are clamped weights 54, 55 and 55'. Secured between weights 55 and 55' and clamped at its periphery between the upper and central body parts 11, 12 is a diaphragm 56 and clamped between the weights 54 and 55 and at its periphery between the central and lower body parts 12, 13 is a diaphragm 57. The diaphragms 56, 57 provide a chamber 58 which is in free communication with chamber 16 by means of passageways 59. A spring 60 bears against the lower end of weight 54 and urges pilot valve 45 against its seat to close passageway 44.

The operation of the apparatus so far described is as follows. Under normal uniform 1 g conditions, pilot valve 45 is held closed by spring 60 and since chambers 28 and 37 are at atmospheric pressure (as explained more fully hereinafter) poppet valve 25 will be held against its seat by spring 31 and poppet valve 22 will be held open by spring 36, as shown in the drawings. The valves serve to vent chamber 16 and thus the pressure in the anti-g suit will be atmospheric. Leakage of high pressure air will be prevented by poppet valve 25 which may be lined with rubber as shown, piston 26 which is provided with a suitable packing and pilot valve 45, which is a metallic needle valve seating in a relatively soft seat for which a non-metallic material such as nylon is suitable.

Under increasing g conditions the inertia of parts 45, 51, 52, 53, 54, 55 and 55' suspended by the pilot poppet valve 45 acts to open the pilot valve against the action of spring 60 so that pressure air flows through passageways 46, 47, 48, 49, 50 and 50' to chambers 37 and 28. Pressure increases in these two chambers, piston 34 being thereby forced upwardly to firmly close valve 22 and piston 26 being forced upwardly to open valve 25. The loading of the springs 36 and 31 is such that valve 22 closes before valve 25 opens. The pressure in chamber 16 and thus the suit pressure then increases and since chamber 58 defined by the diaphragms 56, 57 is in free communication with chamber 16 through the passageways 59 the pressure in chamber 58 also increases. The effective area of diaphragm 57 is less than the effective area of diaphragm 56 so that pressure in the chamber 58 produces a resultant force which is upwards and can overcome the inertia of parts 45, 51, 52, 53, 54, 55 and 55' and which, with the assistance of spring 60 will return the pilot valve 45 to its seat or nearly to its seat during steady, high g conditions. For any given g loading, pressure in chamber 58 which is equal to suit pressure will build up until pilot valve 45 comes close to its seat. The pilot valve 45 is constructed so that it can permit flow of air out of as well as into chambers 37 and 28, the stem 51 of the pilot valve 45 being formed with opposed flats so that air can leak away or be vented through the passages 61 thereby formed into chamber 62 which communicates with the atmosphere and is thus at atmospheric pressure, thus restricting the pressures in chambers 37 and 28 and permitting valves 22 and 25 to remain on or closely adjacent to their seats. For a given steady, high g condition the pilot valve 45 will be sufficiently off its seat to allow enough pressure air to pass the valve to chambers 37 and 28 and thus, by compensating for the air that leaks through passages 61, to maintain the necessary pressures in chambers 37 and 28 so that valves 22 and 25 are maintained pressed against their seats with a light force only nevertheless substantially sealing chamber 16.

Upon cessation of the high g condition the pilot valve 45 closes firmly under the action of spring 60 and chambers 37 and 28 exhaust through passages 61 so that the pressure in the chambers drops to atmospheric and valve 25 is closed under the action of spring 31, valve 22 is opened under the action of spring 36, and the suit pressure returns to atmospheric. Piston 29 acts as a balancing piston, the suit pressure producing on piston 29 an upward force which balances the downward force exerted by the suit pressure on valve 25. In a similar manner piston 34 balances the force exerted by the suit pressure on valve 22.

The inertia members 45, 51, 52, 53, 54, 55 and 55', spring 60 and the diaphragms 56, 57 establish operation according to a given regime known as the "low level setting." A "high level setting" is also desired and this is provided by a further weight 63 which is held inoperative for the low level setting but which is rendered operative to give the high level setting.

Fixed to the upper end plate 14 to extend upwardly therefrom is a sleeve 64 to which an adjusting knob 65 is rotatably secured by means of a helical spring 66 which urges the knob upwardly. To the underside of the knob 65 is secured a U-shaped member providing two depending spring arms 67 which are somewhat stressed in the position shown in Figures 7 and 8 and are urged outwardly from such position under their own resilience. A sheet metal cam member 68 secured between the sleeve 64 and end plate 14 has two pairs of opposed slots, 68', 68' and 71, 71. Slots 71 are less deep than the slots 68' and in the position of the knob 65 shown in Figures 7 and 8 in which the spring arms 67 extend through the slots 71, the base of the slots 71 hold the spring arms inwardly so that the inturned free ends of the spring arms are held beneath the peripheral flange 69 at the top of the weight 63 to secure it in its uppermost position to which it is urged by spring 70.

When it is desired to provide a high level setting the knob 65 is rotated counterclockwise so that the spring arms 67 are forced out of the slots 71, pass over the high parts of the cam member and extend through the slots 68' which allow the spring arms 67 to spring outwardly so that they release flange 69 on weight 63 which is thus freed and rendered operative. Thus, under increasing g conditions the weight 63 will move downwardly to rest on weight 55', the low level setting weights and weight 63 acting together and thus providing a higher suit pressure for a given g condition.

If it be desired to override the pilot valve 45 for test or other purposes this can be effected by pushing the knob 65 downwardly against its retaining spring 66. The spring arms 67 push the weight 63 and the low level setting weights downwardly, valve 45 opening and permitting the suit pressure to increase. On release of the downward pressure on knob 65 the parts return to their original positions under the action of the springs 60, 70 and 66, the pilot valve 45 closing.

Chamber 16 communicates via passageway 72 with an exhaust passageway 73. Passageway 72 is normally held closed by valve 74 which is pressed downwardly on its seat by a helical spring 75 housed in bore 76 in the upper body part 11. Valve 74 operates as a relief valve to ensure that suit pressure will not rise above a predetermined value through any defect in the apparatus.

We claim:

1. Pressure-control apparatus for an anti-g suit, comprising a member responsive to change in velocity along a given axis, a pilot valve actuated by said member responsive to change in velocity, a chamber having an opening for communication with the suit, an outlet opening for placing said chamber in communication with the atmosphere, a slave valve controlling said outlet opening, an inlet opening in said chamber for placing it in communication with a source of pressure fluid, a second slave valve controlling said inlet opening, and means under the control of said pilot valve for actuating said first and second slave valves.

2. Pressure-control apparatus according to claim 1, comprising means controlled by the pressure in said chamber for actuating said pilot valve in opposition to said member responsive to change in velocity.

3. Pressure-control apparatus for an anti-g suit, comprising an inertia member, a pilot valve actuated by said inertia member, a chamber having an opening for communicating with the suit, an outlet opening in said chamber for placing it in communication with the atmosphere, a slave valve controlling said outlet opening, an inlet opening in said chamber for placing it in communication with a source of pressure fluid, a second slave valve controlling said inlet opening, means under the control of said pilot valve for actuating said first and second slave valves, and a second chamber communicating with the first chamber, said second chamber comprising means for actuating said pilot valve in opposition to said inertia member.

4. Pressure-control apparatus according to claim 3, comprising two inertia members for actuating said pilot valves and releasable means for holding one inertia member against relative movement.

5. Pressure-control apparatus according to claim 3, wherein the means in said second chamber for actuating said pilot valve comprises two diaphragms, one of which has an effective area greater than that of the other.

6. Pressure-control apparatus according to claim 3, wherein the means for actuating said first and second slave valves comprises a first cylinder, a first piston movable in said first cylinder and coupled to said first slave valve, said first piston providing in said cylinder a third chamber on the side of the piston remote from the first slave valve, a second cylinder, a second piston movable in said second cylinder and coupled to said second slave valve, said second piston providing in said second cylinder a fourth chamber on the side of the piston remote from the second slave valve, and a passageway for connection to the source of pressure fluid and communicating with said third and fourth chambers, said passageway being controlled by said pilot valve.

7. Pressure-control apparatus according to claim 6, further comprising a third cylinder, a third piston movable in said third cylinder and coupled to said first slave valve, a fourth cylinder, and a fourth piston movable in said fourth cylinder and coupled to said second slave valve, said third and fourth pistons being exposed to the pressure in said first chamber and balancing the effect of such pressure on the first and second slave valves.

8. Pressure-control apparatus for an anti-g suit, comprising a chamber having an opening for communication with said suit, an outlet opening in said chamber for placing it in communication with the atmosphere, a first valve controlling said outlet opening, an inlet opening in said chamber for placing it in communication with a source of pressure fluid, a second valve controlling said inlet opening, pressure-responsive means for actuating said first and second valves, coupling means for connecting said pressure-responsive means with the source of pressure fluid, a third valve controlling said coupling means, means responsive to change in velocity along a given axis for moving said third valve to its open position, and means responsive to the pressure in said chamber for moving said third valve to its closed position.

9. Pressure-control apparatus for an anti-g suit, comprising a chamber having an opening for communication with said suit, an outlet opening in said chamber for placing it in communication with the atmosphere, a first valve controlling said outlet opening, an inlet opening in said chamber for placing it in communication with a source of pressure fluid, a second valve controlling said inlet opening, pressure-responsive means for actuating said first and second valves, coupling means for connecting said pressure-responsive means with the source of pressure fluid, a third valve controlling said coupling means, an inertia member connected with said third valve and effective to move it to its open position, and means responsive to the pressure in said chamber and effective to move the said third valve to its closed position.

10. Pressure-control apparatus according to claim 9, comprising two inertia members for actuating said third valve, and releasable means for holding one of said members inoperative.

11. Pressure-control apparatus according to claim 10, comprising means for holding the said inertia members in the position in which they are operative to hold open the said third valve.

12. Pressure-control apparatus according to claim 9, wherein the means responsive to pressure in said chamber comprises two diaphragms which are connected with said third valve and which define a second chamber which is in communication with the first chamber, one diaphragm having a bigger effective area than that of the other diaphragm.

13. Pressure control apparatus for an anti-g suit comprising: a chamber having an opening for communication with the suit; means for connecting said chamber to a supply of fluid under pressure; fluid pressure operated main valve means for controlling the pressure in said chamber and having three selective operative positions, a first position for venting said chamber, a second position for substantially sealing said chamber, and a third position for supplying said fluid to said chamber; fluid confining means for conveying operating fluid to said main valve means; vent means for said confining means; an auxiliary valve means for controlling the supply of fluid to said confining means, said auxiliary valve means being arranged to be supplied with said fluid under pressure and in a normally closed position to block the supply of fluid to said confining means thereby to maintain said main valve means in its first position; and an inertia member for urging said auxiliary valve means towards its open position for supplying said fluid under pressure to said confining means for positioning the main valve means in its second or third position depending upon the extent of opening of said auxiliary valve means, the quantity of fluid passing through said confining means and vent means being proportionately small whereby the loss of fluid during operative intervals is maintained at a minimum.

References Cited in the file of this patent

UNITED STATES PATENTS

| 175,485 | Miracle | Mar. 28, 1876 |
| 1,063,547 | Kieser | June 3, 1913 |
| 2,499,793 | Stearns | Mar. 7, 1950 |
| 2,622,609 | Moller | Dec. 23, 1952 |
| 2,626,625 | Versoy | Jan. 27, 1953 |

FOREIGN PATENTS

| 604,304 | Great Britain | July 1, 1948 |